(12) United States Patent
Nabetani

(10) Patent No.: US 7,957,346 B2
(45) Date of Patent: Jun. 7, 2011

(54) WIRELESS COMMUNICATION APPARATUS FOR MANAGING HIGH THROUGHPUT BANDWIDTH CHANNEL AVAILABILITY

(75) Inventor: Toshihisa Nabetani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 12/052,286

(22) Filed: Mar. 20, 2008

(65) Prior Publication Data

US 2009/0086802 A1    Apr. 2, 2009

(30) Foreign Application Priority Data

Sep. 28, 2007  (JP) ................. P2007-256405

(51) Int. Cl.
*H04W 4/00* (2009.01)
(52) U.S. Cl. ......... 370/329; 370/445; 455/450; 455/455
(58) Field of Classification Search .................. 370/236, 370/328, 329, 445
See application file for complete search history.

(56) References Cited

U.S. PATENT DOCUMENTS

| | | | |
|---|---|---|---|
| 2006/0025169 A1* | 2/2006 | Maciocco et al. | 455/525 |
| 2006/0034208 A1* | 2/2006 | Blouin | 370/328 |
| 2007/0054645 A1* | 3/2007 | Pan | 455/266 |
| 2008/0181192 A1 | 7/2008 | Nabetani et al. | |
| 2009/0061799 A1* | 3/2009 | Park et al. | 455/127.5 |

OTHER PUBLICATIONS

Part 11: Wireless LAN Medium Access Control (MAC) and Physical Layer (PHY) specification: Amendment <number>: Enhancement for Higher Throughput, IEEE P802.11n/D2.00, Feb. 2007. (To include additional sections cited not provided in Applicant's IDS of date Mar. 20, 2008).*

IEEE P802.11n/D2.00, Chapter 6-Chapter 11 (MAC Layer Part) Feb. 2007.

* cited by examiner

*Primary Examiner* — Huy D Vu
*Assistant Examiner* — Maria Sekul
(74) *Attorney, Agent, or Firm* — Turocy & Watson, LLP

(57) ABSTRACT

According to an aspect of the invention, there is provided a wireless communication apparatus for performing a first wireless communication with a first channel having a first bandwidth, and a second wireless communication with a second channel having a second bandwidth wider than the first bandwidth and having a frequency band covering the first channel, in accordance with CSMA/CA system by carrier sense, including: a predicting unit predicting a first time required until a transmission right for the first wireless communication is captured, and a second time required until a transmission right for the second wireless communication is captured; a judging unit judging that either one communication is recommended based upon the first and second times; and a producing unit producing, when judged that a wireless communication different from a present wireless communication is recommended, a notification frame including information indicative of the recommended wireless communication.

12 Claims, 4 Drawing Sheets

WIRELESS COMMUNICATION APPARATUS FOR MANAGING HIGH THROUGHPUT BANDWIDTH CHANNEL AVAILABILITY

CROSS-REFERENCE TO RELATED APPLICATIONS

This application is based on and claims the benefit of priority from the prior Japanese Patent Application No. 2007-256405, filed on Sep. 28, 2007; the entire contents of which are incorporated herein by reference.

TECHNICAL FIELD

The present invention is related to a technical field of wireless communications, and more specifically, is directed to a wireless communication apparatus for performing media access controls based upon carrier sensing mechanism.

BACKGROUND

Description of Related Art

The media access control (MAC) corresponds to control operation in which when a plurality of communication apparatuses are communicated with each other while commonly share the same media, the control operation determines that the respective communication apparatuses transmit communication data while how these communication apparatuses utilize the same media.

In wireless communications, there are several media access control methods capable of transmitting communication data in higher efficiencies by a plurality of wireless communication apparatuses. In the IEEE 802.11 rule corresponding to the typical standard rule of the wireless LANs, the CSMA/CA (Carrier Sense Multiple Access with Collision Avoidance) system has been employed as the media access control method. That is, in the CSMA/CA system, in order to avoid collisions among data, the data are transmitted after such a confirmation is made by carrier sense that the media are continuously idle for a time duration longer than, or equal to a predetermined time (continuous waiting time). In this case, the above-described continuous waiting time is obtained by adding a waiting time having a random length for each of the wireless communication apparatuses to a minimum time. Since such a continuous waiting time is defined, it is possible to avoid that the plurality of wireless communication apparatuses transmit data at the same time after a predetermined time has elapsed since the immediately before data communication was carried out.

Also, in the IEEE 802.11n rule corresponding to higher-speed wireless LAN rules, the method for extending the frequency band (namely, media) has been proposed as one approach capable of increasing the communication speeds. In the existing IEEE 802.11 wireless LAN systems (namely, IEEE 802.11a/11b/11g), wireless communications are carried out through the frequency band of 20 MHz per 1 channel. In an IEEE 802.11n wireless LAN system, a channel is extended up to an adjacent channel, wireless communications can be realized through the frequency band of 40 MHz over 2 channels (namely, main channel and adjacent channel) (refer to, for example, IEEE P802.11nTM/D2.00, February 2007). In the IEEE 802.11n rule, within 2 channels, one channel which is employed in the conventional communication in the frequency band of 20 MHz is referred to as either a "control channel" or a "primary channel", whereas the other (adjacent) channel is referred to as either an "extension channel" or a "secondary channel", which is utilized as such a channel in order to extend the frequency band when the communication is carried out in the frequency band of 40 MHz.

On the other hand, in the above-described IEEE 802.11 rule, such a management frame has been defined which is called as the "recommended Transmission Channel Width Action" frame (will be referred to as "recommended bandwidth notification frame" hereinafter). This recommended bandwidth notification frame implies such a management frame provided in order that a wireless communication apparatus having a 40 MHz-communication function designates that a data frame transmission through either the frequency band of 40 MHz or the frequency band of 20 MHz is wanted to be performed, and then, notifies the designated data frame transmission to a wireless communication apparatus of a counter party. When the wireless communication apparatus of the counter party receives the recommended bandwidth notification frame, this wireless communication apparatus normally transmits the data frame by employing the recommended bandwidth notified to the own wireless communication apparatus in accordance with this notified recommended bandwidth.

SUMMARY

It is conceivable that a wireless communication apparatus having a 40 MHz-communication function notifies such a recommended bandwidth notification frame for recommending the frequency bandwidth of 40 MHz by which high throughput can be expected with respect to a wireless communication apparatus having the 40 MHz-communication function as a communication counter party so as to recommend a transmission operation in the 40 MHz-frequency bandwidth.

However, when the transmission operation is carried out in the frequency band of 40 MHz, similar to the conventional 20 MHz-transmission operation, the carrier sensing operation in the frequency band of 40 MHz must be performed in accordance with the CSMA/CA system in order to capture a transmission right. Accordingly, the carrier sensing operations are carried out in two channels, namely, a control channel and an extension channel located adjacent to the control channel. As a result, generally speaking, there are some possibilities that a lengthy time is necessarily required until a transmission right is captured in a 40 MHz-transmission operation, as compared with a 20 MHz-transmission operation.

As a consequence, among wireless communication apparatuses, in an actual case, the below-mentioned transmitting operation conditions are present in a mixed manner: If the 40 MHz-transmission operation is selected, then higher throughput can be achieved; and if the 20 MHz-transmission operation is selected, then higher throughput can be achieved. However, conventionally, no specific consideration has been made with respect to such a technical aspect that since these 20 MHz/40 MHz-transmission operations are selectively utilized in a proper manner, the recommended transmission channel width (frequency bandwidth) capable of improving the throughput is employed.

According to an aspect of the invention, there is provided a wireless communication apparatus for performing a first wireless communication with a first channel having a first bandwidth, and a second wireless communication with a second channel having a second bandwidth wider than the first bandwidth and having a frequency band covering the first channel, in accordance with CSMA/CA system by a carrier sense, including: a predicting unit configured to predict a first time required until a transmission right for the first wireless communication is captured, and a second time required until a transmission right for the second wireless communication is captured, respectively; a judging unit configured to judge that either one of the first wireless communication and the second wireless communication is recommended based upon the first time and the second time; and a producing unit producing, when the judging unit judges that a wireless communication different from a present wireless communication is recommended, a notification frame including information indicative of the recommended wireless communication. The produced notification frame is transmitted.

DESCRIPTION OF THE EMBODIMENTS

Referring now to drawings, embodiments will be described in detail.

Figure 1:
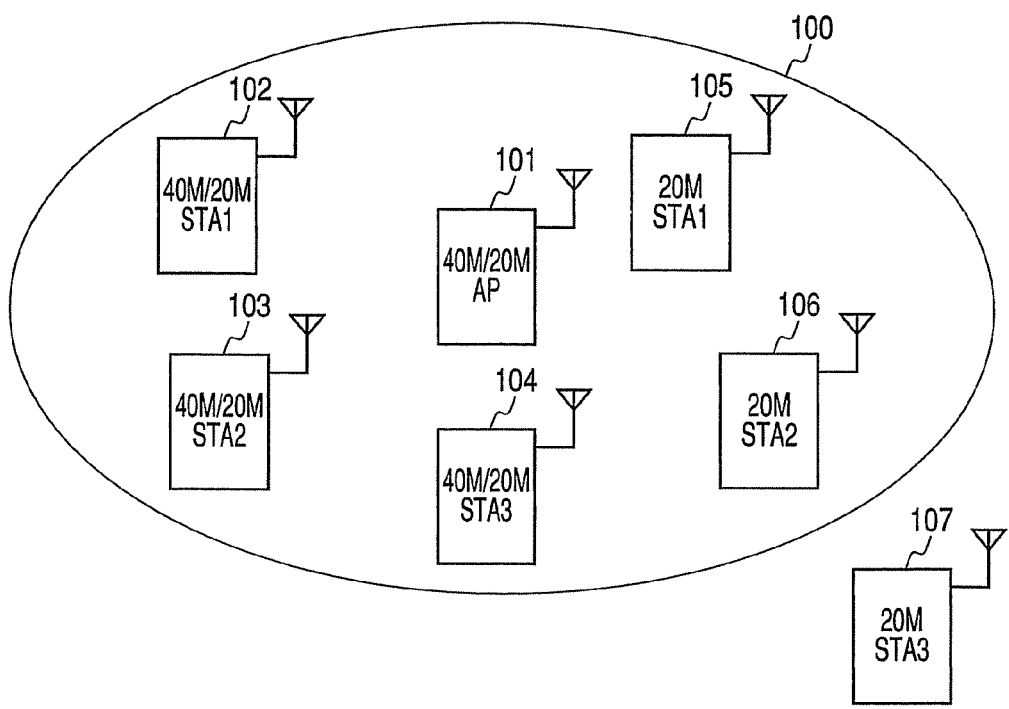
FIG. 1 is a diagram for showing a structural example of a network which contains a wireless communication apparatus according to an embodiment of the present invention.

FIG. 1 indicates an example of a network (BSS: Basic Service Set) 100 arranged by a plurality of wireless communication apparatuses containing a wireless communication apparatus (namely, base station 101, and terminals 102 to 104) according to the present embodiment. In the network 100, a wireless communication is performed based upon the CSMA/CA system, and while 2 sorts of communication channels whose frequency bands are different from each other are utilized, data transmission and data reception are carried out among the wireless communication apparatuses. In the below-mentioned descriptions, such an example is exemplified that a first frequency bandwidth is 20 MHz, and a second frequency bandwidth is 40 MHz.

The base station 101 located within the network 100 is an access point where data transmitting/receiving operations can be carried out via the channel of 40 MHz-frequency bandwidth and the channel of 20 MHz-frequency bandwidth. The terminals 102 to 106 have established associations with the base station 101. In this case, the terminal 102, 103, 104 can perform data transmitting/receiving operations through the channel of 40 MHz-frequency bandwidth and the channel of 20 MHz-frequency bandwidth, whereas the terminals 105 and 106 can perform data transmitting/receiving operations only through the channel of 20 MHz-frequency bandwidth. It is so assumed that another terminal 107 shown in FIG. 1 belongs to another network other than the network 100, while the first-mentioned network uses, for example, 20M.ch_b.

Figure 2A:
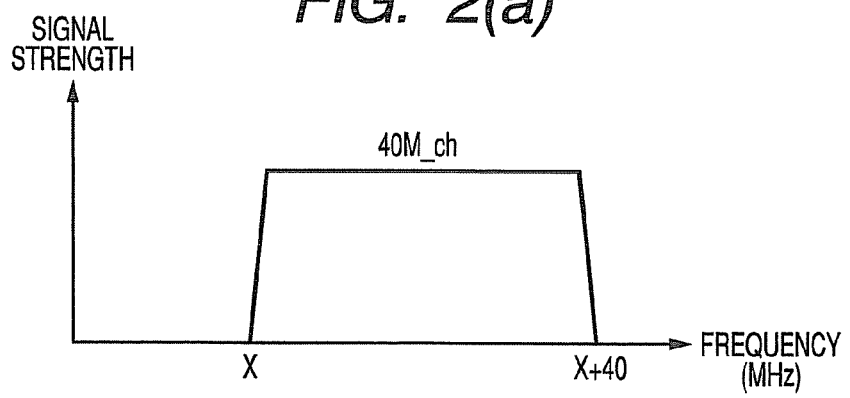
FIGS. 2(a), 2(b) are diagrams for explaining both a first channel having a first bandwidth and a second channel having a second bandwidth in the embodiment.
Figure 2B:
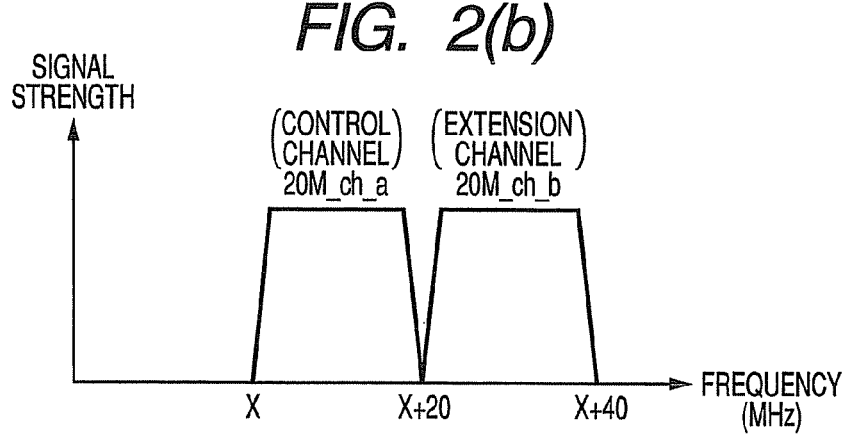

In the network 100 of FIG. 1, as communication channels represented in FIGS. 2(a), 2(b), these communication channels contain a channel "20M_ch_a" of 20 MHz which employs a frequency band from X MHz to (X+20) MHz, and also, another channel "40M_ch" of 40 MHz which employs a frequency band from X MHz to (X+40) MHz. As a consequence, the frequency band from X MHz to (X+20) MHz is utilized in the repetition form in the channel "20M_ch_a" of 20 MHz and the channel "40M_ch" of 40 MHz.

Another channel "20M_ch_b" using a frequency band from (X+20) MHz to (X+40) MHz is not used in the network 100, but may be used in another network (for example, network containing terminal 107). As a consequence, in such a case that another network using the channel "20M_ch_b" is located adjacent to (overlapped with) the network 100, the channel "20M_ch_b" is also overlapped with the channel "40M_ch" of 40 MHz using the frequency band from X MHz to (X+40) MHz.

Also, a terminal having a 40 MHz-communication function can select either a communication operation executed in the 40 MHz-band or a communication operation executed in the 20 MHz-band every data frame, and can transmit data in the selected frequency band. More concretely speaking, the base station 101, and the terminals 102, 103, 104, which have the 40 MHz-communication function can notify such a bandwidth which is wanted to be used when data directed to the own terminal is transmitted, while the below-mentioned recommended bandwidth is contained in the recommended bandwidth notification frame. The above-described recommended bandwidth indicates any one of "only 20 MHz-band is used (band of 20 MHz is recommended)" and "any one of 20 MHz-band and 40 MHz-band may be used (band of 40 MHz is recommended)." Also, when a data frame is transmitted, the base station 101, and the terminals 102, 103, 104 can determine a transmission bandwidth based upon a recommended bandwidth which is notified from a counter terminal of a transmission destination by a recommended bandwidth notification frame, and then, can transmit the data frame via the determined transmission bandwidth.

The above-described network 100 can be constructed if such a network 100 is designed based upon, for instance, the IEEE 802.11n standard corresponding to one of the wireless LAN systems. In this case, in the network 100, "20M_ch$_a$" corresponds to a control channel (primary channel) for performing the existing 20 MHz-channel transmission, whereas "20M_ch_b" corresponds to an extension channel (secondary channel) located adjacent to the control channel. Also, as the recommended bandwidth notification frame, in the IEEE 802.11n standard, while the Recommended Transmission Channel Width Action frame is employed, such a frequency bandwidth (either 20 MHz or 40 MHz) which is wanted to be used when data is transmitted to the own terminal can be notified with respect to each of communication counter terminals.

Figure 3:
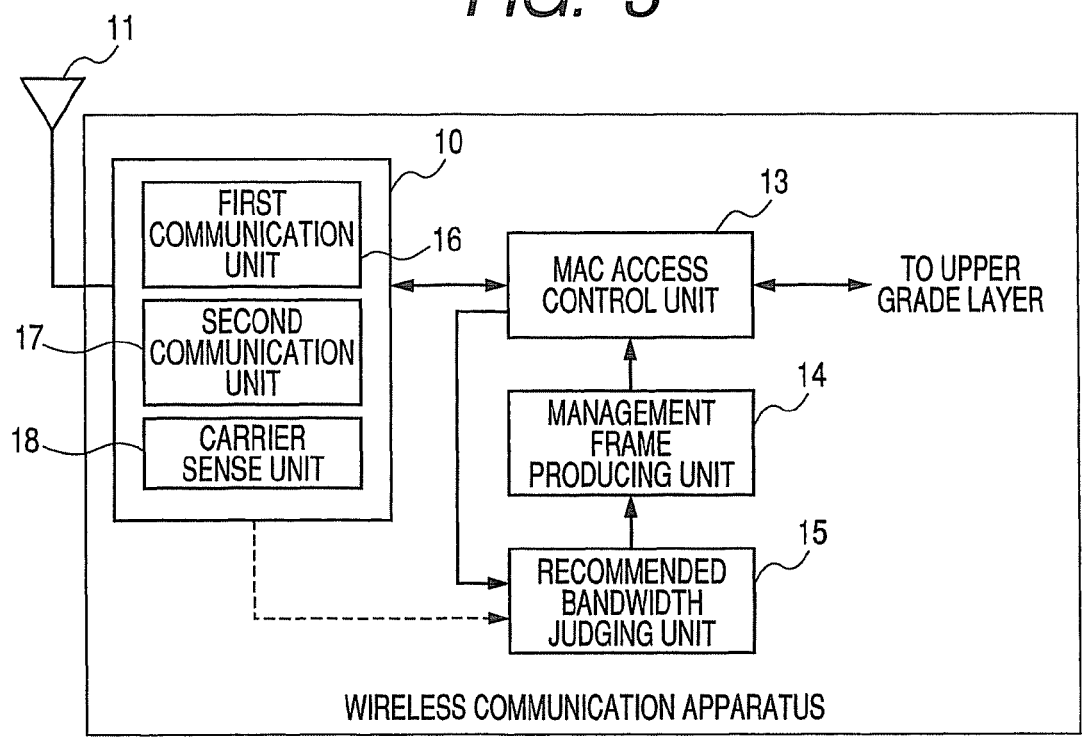
FIG. 3 is a block diagram for describing a structural example of the wireless communication apparatus according to the embodiment.

Next, FIG. 3 is a block diagram for showing an arrangement of a wireless communication apparatus (base station 101, terminals 102 to 104) according to the present embodiment. The wireless communication apparatus is equipped with an antenna unit 11, a physical layer unit 10, an MAC access control unit 13, a management frame producing unit 14, and a recommended bandwidth judging unit 15.

The physical layer unit 10 is adapted to communications in two sorts of channels in which frequency bands utilized in FIG. 1 are different from each other. In other words, the physical layer unit 10 is equipped with a first communication unit 16 which performs a physical layer process operation required for transmissions and receptions in order to execute a wireless communication by employing a first channel having 20 MHz corresponding to the first frequency bandwidth. It should also be noted that the first channel having the first frequency bandwidth which is utilized in the first communication unit 16 corresponds to the control channel (primary channel) defined in the IEEE 802.11n standard.

Also, the physical layer unit 10 is equipped with a second communication unit 17 which performs a physical layer process operation required for transmissions and receptions in order to execute a wireless communication by employing a second channel having 40 MHz corresponding to such a frequency bandwidth which is overlapped with the first frequency bandwidth, and is wider than the first frequency bandwidth. It should also be understood that the frequency bandwidth from the second channel of the second frequency bandwidth used in the second communication unit 17 except for the first channel of the first frequency bandwidth corresponds to the extension channel (secondary channel) defined in the IEEE 802.11n standard. Also, in view of actual circuit packaging, there are many opportunities that a circuit is commonly used between the first communication unit 16 and the second communication unit 17. Accordingly, these first and second communication units 16 and 17 may not be always and independently provided.

The physical layer unit 10 is further equipped with a carrier sense unit 18. The carrier sense unit 18 performs a carrier sensing process operation required in the CSMA/CA system so as to check whether or not an empty status (either Idle status or Busy status) of a channel is detected, namely, whether or not a carrier is detected. In this example, it is so assumed that in the carrier sensing process operation of the carrier sense unit 18, any of carrier sensing process operations in the control channel of 20 MHz, and the extension channel of 20 MHz and the channel of 40 MHz can be carried out. It should also be understood that when the carrier sensing process operation of the 40 MHz-channel is performed, the carrier sensing process operation may be directly performed as the entire 40 MHz-channel so as to be managed. Alternatively, carrier sense statuses of 2 sets of the 20 MHz-channels (namely, control channel and extension channel) may be combined with each other, and then, the combined carrier sense status may be regarded as a carrier sense status of the 40 MHz-channel so as to be managed.

The carrier sense unit 18 notifies a carrier sensed result to the MAC address control unit 13. Also, the carrier sense unit 18 may notify the carrier sensed result to a recommended bandwidth judging unit 15, if necessary.

The MAC access control unit 13 captures a transmission right based upon the carrier sensed result, and thereafter, transmits a recommended bandwidth notification frame via the physical layer unit 10 to a counter terminal of a data transmission source so as to notify a recommended bandwidth. Also, the MAC access control unit 13 further performs a MAC process operation such as an MAC header analysis which is required in the transmission/reception control unit 13. In the case of the IEEE 802.11, the MAC access control unit 13 captures the transmission right based upon DCF (Distributed Coordination Function), or EDCA (Enhanced Distributed Channel Access) of the CSMA/CA base by the carrier sensing process operation.

The management frame producing unit 14 produces all of management frames which are utilized in an MAC layer, and also, produces a recommended bandwidth notification frame containing a recommended channel (will be explained later). The produced management frame and the formed recommended bandwidth notification frame are outputted to the MAC access control unit 13. As previously described, the recommended bandwidth notification frame corresponds to the Recommended Transmission Channel Width Action frame defined in the IEEE802.11n standard. Also, the information indicative of the recommended channel may be alternatively notified by employing the following method: That is, this information indicative of the recommended channel is contained in the "Recommended Transmission Channel Width field" within the Additional HT Information Element of such a frame as the Beacon frame, the Probe Response frame, and the Association Response frame defined in the IEEE 802.11 so as to be notified. In this case, the recommended bandwidth notification frame corresponds to the Beacon frame, the Probe Response frame, and the Association Response frame.

The recommended bandwidth judging unit 15 determines a recommended bandwidth which should be properly transmitted by considering a time required for acquiring a transmission right in such a case that the wireless communication apparatus of the communication counter party transmits in the first frequency bandwidth and the second frequency bandwidth, and checks whether or not the recommended bandwidth is required to be changed, and further, when the recommended bandwidth is required to be changed, the recommended bandwidth judging unit 15 issues such an instruction that the recommended bandwidth is required to be changed. In this example, it is so assumed that the recommended bandwidth is selected to be either the "20 MHz" bandwidth or the "40 MHz" bandwidth. The recommended bandwidth determined by the recommended bandwidth judging unit 15 is notified to the management frame producing unit 14.

Figure 4:
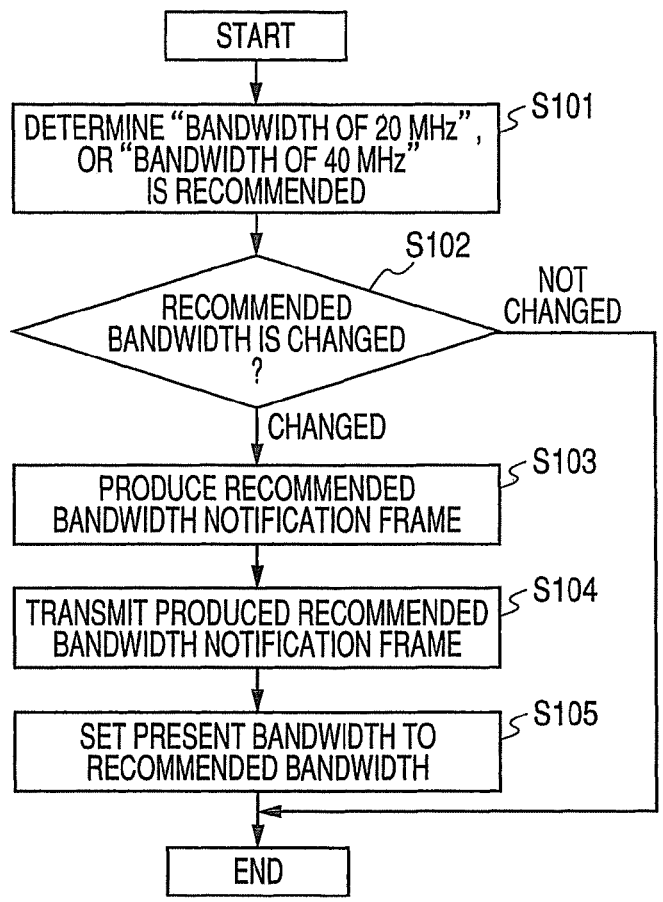
FIG. 4 is a diagram for showing an operation flow related to a recommended bandwidth notified by the wireless communication apparatus according to the embodiment.

Next, a description is made of an operation flow related to notification of the recommended bandwidth by the above-described wireless communication apparatus with reference to FIG. 4. When a predetermined condition can be established, the recommended bandwidth judging unit 15 starts the operation flow of FIG. 4. The above-described expression "when the predetermined condition is established" implies "when a channel utilization ratio is changed, or any of threshold values is changed in the case of a first embodiment and a third embodiment; and also, implies" when a time required until a transmission right is captured is changed, or when any one of threshold values is changed in the case of a second embodiment among the below-mentioned respective embodiments". The recommended bandwidth judging unit 15 determines such a recommended frequency bandwidth capable of realizing superior throughput by considering a time required until a transmission right is captured in the case that the own wireless communication apparatus transmits in such a bandwidth via which a data frame is wanted to be received from another wireless communication apparatus associated in the network 100, namely, in the case that another wireless communication apparatus transmits in both the first frequency bandwidth and the second frequency bandwidth (step S101) In this step S101, the recommended bandwidth judging unit 15 determines that the frequency bandwidth of 20 MHz is recommended, or the frequency bandwidth of 40 MHz is recommended.

The recommended bandwidth judging unit 15 compares the recommended bandwidth determined in the step S101 with the previous recommended bandwidth before the determination thereof so as to check whether or not the determined recommended bandwidth is equal to the previous recommended bandwidth (step S102). As a result of this comparison, when the determined recommended bandwidth is equal to the previous recommended bandwidth, the present operation flow is accomplished. On the other hand, when the determined result (recommended bandwidth) of the step S101 is different from the previous recommended bandwidth before the determination, the recommended bandwidth judging unit 15 notifies this determined result to the management frame producing unit 14.

The management frame producing unit 14 produces a recommended bandwidth notification frame containing the information indicative of this determined result (step S103), and then, transmits the produced recommended bandwidth notification frame to the MAC access control unit 13. The MAC access control unit 13 transmits the received recommended bandwidth notification frame to the physical layer unit 10, and captures a transmission right by the first communication unit 16, and thereafter, transmits the recommended bandwidth notification frame via the first communication unit 16 (step S104). It should also be noted that when this recommended bandwidth notification frame is transmitted, although a broadcast transmission is preferably employed, a unicast transmission for individually transmitting to the wireless communication apparatuses may be alternatively employed.

Also, the physical layer unit 10 sets a bandwidth based upon the information indicative of the determined result containing the recommended bandwidth notification frame (step S105).

The wireless communication apparatus equipped with the above-described operation flow, according to the present embodiment, can notify such a recommended bandwidth by which it can predict that the superior throughput can be obtained with respect to the wireless communication apparatus of the communication counter party. Also, changing of the recommended bandwidths can be performed at proper timing while a series of the data frames are received. As a result, it is possible to expect that the throughput of the wireless communication can be improved.

Since the recommended bandwidth is determined by employing "prediction time", it is desirable to set that the recommended bandwidth is changed only when the following conditions are judged: "Apparently, it becomes better that bandwidth of 20 MHz is probably recommendable", or "apparently, it becomes better that bandwidth of 40 MHz is probably recommendable."

Next, embodiments as to the recommended bandwidth judging unit 15 for notifying the recommended bandwidth, according to the present embodiment, will be now described as follows; and a description will now be made how to determine a recommended bandwidth.

First Embodiment

Figure 5:
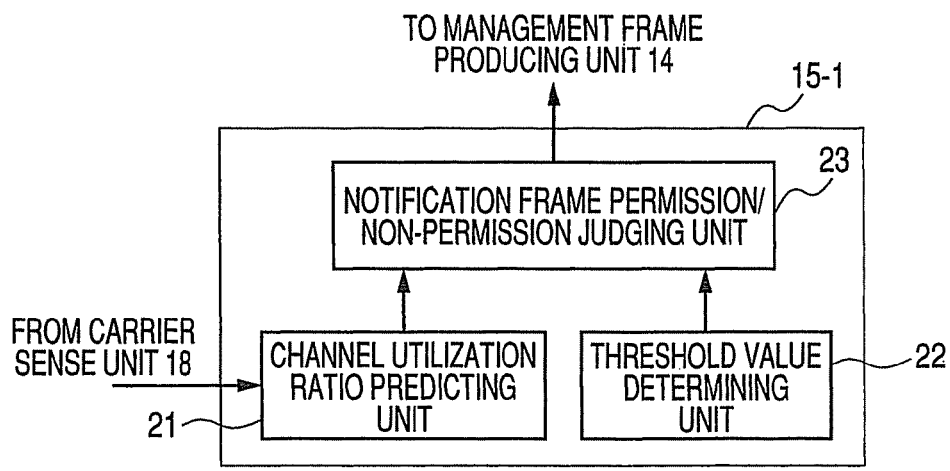
FIG. 5 is a functional block diagram for indicating a first embodiment as to the recommended bandwidth judging unit 15 of the wireless communication apparatus shown in FIG. 3.

As a first embodiment, a description is made of a recommended bandwidth judging unit 15-1 for predicting a carrier utilization ratio which utilizes a carrier sense result. FIG. 5 indicates a function block of the recommended bandwidth judging unit 15-1 of the first embodiment.

The recommended bandwidth judging unit 15-1 is equipped with a channel utilization ratio predicting unit 21, a threshold value determining unit 22, and a notification frame permission/non-permission judging unit 23.

The channel utilization ratio predicting unit 21 predicts such a ratio for indicating that how degree a channel has been utilized within a predetermined time period (namely, channel utilization ratio). In this embodiment, as to a subject for predicting a channel utilization ratio, any one of a combination between the control channel of 20 MHz and the extension channel of 20 MHz, and another combination between the control channel of 20 MHz and the channel of 40 MHz is supposed. In the channel utilization ratio predicting unit 21, the carrier sense result is inputted from the carrier sense unit 18, and such a time during which the channel is "Busy" is measured so as to calculate a ratio thereof (Busy ratio).

It should be understood that several predicting methods other than the above-described channel utilization ratio predicting method may be applied to the channel utilization ratio predicting unit 21. For example, in the case of a wireless LAN constructed by the IEEE 802.11e standard, the prediction of the channel utilization ratio may be alternatively realized by the below-mentioned method. That is, a Busy ratio of a channel measured by an access point is notified by a Channel Utilization field of a QBSS Load element within a Beacon frame, so that since the channel utilization ratio predicting unit 21 extracts the value of the Channel Utilization field without measuring this value, the channel utilization ratio can be grasped. Also, when a wireless LAN is constructed based upon the IEEE 802.11h standard, since a CCA Request frame and a CCA Response frame are transmitted/received, a utilization ratio (Busy ratio) of a channel can be grasped in a CCA Busy Fraction field. As a result, the channel utilization ratio predicting unit 21 may utilize the above-explained grasping methods.

Also, in such a case that the present wireless communication apparatus is an access point, instead of the above-described calculation in which the channel utilization ratio predicting unit 21 calculates the Busy ratio based upon the carrier sense, the channel utilization ratio predicting unit 21 may alternatively calculate a utilization ratio of a channel by predicting that how degree the channel is utilized within a predetermined time period based upon Traffic Stream (TS) information which have been set by the respective terminals, and a total number of the terminals associated in the present wireless communication apparatus.

Alternatively, the prediction of the channel utilization ratio may be realized as follows: That is, channel utilization ratios may be continuously averaged when a BSS is commenced, or when the BSS is entered; channel utilization ratios may be averaged/updated every time a certain constant time period (for example, Beacon interval time period) has elapsed; channel utilization ratio may be averaged/updated every time a predetermined frame transmission number is established, or a predetermined frame reception number is established; and the like, namely, the channel utilization ratios may be averaged every time which frequency/interval are established.

The threshold value determining unit 22 determines such a threshold value which is used so as to judge whether or not a transmission of a recommended bandwidth notification frame is permitted by the notification frame permission/non-permission judging unit 23, while employing the channel utilization ratios in 2 sorts of the channels (namely, combination of 20 MHz-control channel and 20 MHz-extension channel, or combination of 20 MHz-control channel and 40 MHz-channel), which are obtained in the channel utilization ratio predicting unit 21.

The notification frame permission/non-permission judging unit 23 judges that the recommended bandwidth corresponds to either "bandwidth of 20 MHz is recommended" or "bandwidth of 40 MHz is recommended" based upon the channel utilization ratio derived from the channel utilization ratio predicting unit 21 and the threshold value derived from the threshold value determining unit 22, and when the preceding judgement is required to be changed, the notification frame permission/non-permission judging unit 23 judges that the recommended bandwidth notification frame is notified.

In such a case that the notification frame permission/non-permission judging unit 23 judges that the recommended bandwidth notification frame of either "bandwidth of 20 MHz is recommended" or "bandwidth of 40 MHz is recommended" is notified, the notification frame permission/non-permission judging unit 23 instructs the management frame producing unit 14 to produce the relevant recommended bandwidth notification frame.

As a consequence, the recommended bandwidth notification frame is produced by the management frame producing unit 14; under control of the MAC access control unit 19, a transmission right is captured based upon DCF (distributed Coordination Function), or EDCA (Enhanced Distributed Channel Access) of the CSMA/CA base by the carrier sense corresponding to the MAC access control of the IEEE 802.11; and thereafter, the recommended bandwidth notification frame is transmitted via the physical layer unit 10 so as to notify the commended bandwidth. It should also be noted that as a transmission destination, it is also desirable to notify the recommended bandwidth notification frame to the entire wireless communication system (broadcast communication) of the present embodiment without individually designating transmission counter terminals. Alternatively, the recommended bandwidth notification frame may be individually transmitted only to the communication counter terminals (unicast communication) by employing different threshold values for the respective transmission counter terminals.

Next, one example as to the notification permission/non-permission judging process operation of the recommended bandwidth notification frame which is executed in the notification frame permission/non-permission judging unit 23 is represented, and will now be explained.

A first description is made of such a condition that the bandwidth has been notified based upon "bandwidth of 20 MHz is recommended."

While employing a channel utilization ratio of the 20 MHz-control channel and a channel utilization ratio of the 20 MHz-extension channel, the notification frame permission/non-permission judging unit 23 of the present wireless communication apparatus compares the channel utilization ratio of the 20 MHz-control channel with a threshold value 1, and furthermore, compares the channel utilization ratio of the 20 MHz-extension channel with a threshold value 2.

In this case, the threshold value 1 and the threshold value 2 are determined by the threshold value determining unit 22, and may be set as a fixed value respectively, or may be alternatively set as a value in response to a status, respectively, each time. Otherwise, a proper value may be alternatively selected from previously prepared values as the threshold value 1 and the threshold value 2 in response to a status. In this selection, it is desirable to perform determination of these threshold values in such a manner that such a relationship of "threshold value 1<threshold value 2" can be basically established as a large/small relationship between the threshold value 1 and the threshold value 2. However, these threshold values may be alternatively determined based upon any sorts of methods, but are not limited only to the above-described determination methods.

As a result of the comparisons, in such a case that the channel utilization ratio of the 20 MHz-control channel is higher than the threshold value 1, and the channel utilization ratio of the 20 MHz-extension channel is lower than the threshold value 2, since an influence caused by such a time is small, which is required until the transmission right is captured in the 40 MHz-transmission by the carrier sense, the notification frame permission/non-permission judging unit 23 judges that the recommended bandwidth corresponds to "bandwidth of 40 MHz is recommended", and thus, instructs the management frame producing unit 14 to form such a recommended bandwidth notification frame of "bandwidth of 40 MHz is recommended." On the other hand, as a result of comparisons, in the case that the channel utilization ratio of the 20 MHz-control channel is lower than the threshold value 1, or in the case that the channel utilization ratio of the 20 MHz-extension channel is higher than the threshold value 2, since an influence caused by such a time is large, which is required until the transmission right is captured in the 40 MHz-transmission, and accordingly, even if the 40 MHz-transmission is carried out, then the superior throughput cannot be obtained, as compared with that of the 20 MHz-transmission, the notification frame permission/non-permission judging unit 23 judges that the recommended bandwidth corresponds to "bandwidth of 20 MHz is recommended", and thus, does not issue any instruction with respect to the management frame producing unit 14, because the notification frame permission/non-permission judging unit 23 may merely maintain the present bandwidth.

A next description is made of such a condition that the bandwidth has been notified based upon "bandwidth of 40 MHz is recommended."

While employing a channel utilization ratio of the 20 MHz-control channel and a channel utilization ratio of the 20 MHz-extension channel, the notification frame permission/non-permission judging unit 23 of the present wireless communication apparatus compares the channel utilization ratio of the 20 MHz-control channel with a threshold value 4, and furthermore, compares the channel utilization ratio of the 20 MHz-extension channel with a threshold value 5.

In this case, the threshold value 4 and the threshold value 5 are determined by the threshold value determining unit 22, and may be set as a fixed value respectively, or may be alternatively set as a value in response to a status, respectively, each time. Otherwise, a proper value may be alternatively selected from previously prepared values as the threshold value 4 and the threshold value 5 in response to a status. In this selection, it is desirable to perform determination of these threshold values in such a manner that such a relationship of "threshold value 4<threshold value 5" can be basically established as a large/small relationship between the threshold value 4 and the threshold value 5. However, these threshold values may be alternatively determined based upon any sorts of methods, but are not limited only to the above-described determination methods.

As a result of the comparisons, in such a case that the channel utilization ratio of the 20 MHz-control channel is lower than the threshold value 4, and the channel utilization ratio of the 20 MHz-extension channel is higher than the threshold value 5, a time required until the transmission right is captured in the 40 MHz transmission by the carrier sense becomes longer than a time required until the transmission right is captured when the 20 MHz-transmission is carried out. As a result, if the 20 MHz-transmission is carried out, then superior throughput can be obtained, as compared with the execution of the 40 MHz-transmission, so that the notification frame permission/non-permission judging unit 23 judges that the recommended bandwidth corresponds to "bandwidth of 20 MHz is recommended", and thus, instructs the management frame producing unit 14 to form such a recommended bandwidth notification frame of "bandwidth of 20 MHz is recommended." On the other hand, as a result of the comparisons, in the case that the channel utilization ratio of the 20 MHz-control channel is higher than the threshold value 4, or in the case that the channel utilization ratio of the 20 MHz-extension channel is lower than the threshold value 5, since an influence caused by such a time is small, which is required until the transmission right is captured in the 40 MHz-transmission, the notification frame permission/non-permission judging unit 23 judges that the recommended bandwidth corresponds to "bandwidth of 40 MHz is recommended", and thus, does not issue any instruction with respect to the management frame producing unit 14, because the notification frame permission/non-permission judging unit 23 may merely maintain the present bandwidth. It should also be understood that both the threshold values 1 and 4, and both the threshold values 2 and 5 may be set to the same values respectively, or may be alternatively set to different values from each other.

Since the above-described process operations are carried out, it is possible to realize the judging process operation for notifying the recommended bandwidth notification frame. It should also be understood that in the above-described embodiment 1, the channel utilization ratio of the 20 MHz-control channel and the channel utilization ratio of the 20 MHz-extension channel have been employed. Alternatively, instead of the above-explained channel utilization ratios, both the channel utilization ratio of the 20 MHz-control channel and the channel utilization ratio of 40 MHz-channel may be employed. Also, in such a case that a combination of the 20 MHz-control channel and the 40 MHz-channel is employed as the channel utilization ratios, the channel utilization ratio of the 20 MHz-control channel may be merely compared with the threshold value 1 (threshold value 4), and the channel utilization ratio of the 40 MHz-channel may be merely compared with the threshold value 3 (threshold value 6). In this case, similar to the small/large relationship between the threshold value 1 (threshold value 4) and the threshold value 2 (threshold value 5), although it is desirable that such a relationship between the threshold value 1<the threshold value 3 (threshold value 4<threshold value 6) can be basically established, the present invention is not limited thereto.

Also, when the notification frame permission/non-permission judging unit 23 performs the judging process operation for notifying the recommended bandwidth notification frame, while the above-described method is not executed by which the channel utilization ratios of the 20 MHz-control channel and the 20 MHz-extension channel (otherwise, 20 MHz-control channel and 40 MHz-channel) are judged based upon the different threshold values from each other, either a difference or a ratio of the both channel utilization ratios may be alternatively calculated, so that these channel utilization ratios may be alternatively judged based upon only one threshold value. For instance, assuming now that the channel utilization ratio of the 20 MHz-control channel is 20% and the channel utilization ratio of the 20 MHz-extension channel is 60%, in the case that a ratio of these channel utilization ratios is calculated, it is given as 60%/20%=3 (in this case, channel utilization ratio of control channel is employed as denominator). Otherwise, in the case that a difference between the channel utilization ratios is calculated, it is given as 60%−20%=40%. Then, such a threshold value which is compared with either the ratio or the difference of the channel utilization ratios may be prepared so as to be used in the judgments.

Concretely speaking, under such a condition that the bandwidth has been notified as "bandwidth of 20 MHz is recommended", as a result of comparisons, in the case that either a ratio or a difference of the channel utilization ratios is lower than a threshold value 7, an influence caused by a time is small, which is required until the transmission right is captured in the 40 MHz-transmission, and a deterioration of throughput does not occur. Thus, the notification frame permission/non-permission judging unit 23 judges that the recommended bandwidth corresponds to "bandwidth of 40 MHz is recommended", and then, instructs the management frame producing unit 14 to form such a recommended bandwidth notification frame of "bandwidth of 40 MHz is recommended." On the other hand, as a result of comparisons, in the case that either the ratio or the difference of the channel utilization ratios is higher than the threshold value 7, an influence caused by a time is large, which is required until the transmission right is captured in the 40 MHz-transmission, so that even when the 40 MHz-transmission is carried out, such a superior throughput cannot be achieved, as compared with that achieved when the 20 MHz-transmission is carried out. As a consequence, the notification frame permission/non-permission judging unit 23 judges that the recommended bandwidth corresponds to "bandwidth of 20 MHz is recommended", and may merely maintain the present bandwidth, and therefore, does not issue any instruction with respect to the management frame producing unit 14.

Also, under such a condition that the bandwidth has been notified as "bandwidth of 40 MHz is recommended", as a result of comparisons, in the case that either a ratio or a difference of the channel utilization ratios is higher than a threshold value 8, a lengthy time is required until the transmission right is captured in the 40 MHz-transmission, as compared with that of the 20 MHz-transmission. As a result, the notification frame permission/non-permission judging unit 23 judges that superior throughput can be obtained in the 20 MHz-transmission rather than the 40 MHz-transmission, and then, instructs the management frame producing unit 14 to form such a recommended bandwidth notification frame of "bandwidth of 20 MHz is recommended." On the other hand, as a result of comparisons, in the case that either the ratio or the difference of the channel utilization ratios is lower than the threshold value 8, since the notification frame permission/non-permission judging unit 23 may merely maintain the present "bandwidth of 40 MHz is recommended", the notification frame permission/non-permission judging unit 23 does not issue any instruction to the management frame producing unit 14. Similar to the previous threshold values, it should also be understood that both the threshold values 7 and 8 may be set to the same values respectively, or may be alternatively set to different values from each other.

Next, another embodiment as to the recommended bandwidth judging unit 15 for notifying the recommended bandwidth, according to the present embodiment, will be now described as follows; and a description will now be made how to determine a recommended bandwidth.

Second Embodiment

A second embodiment is such a recommended bandwidth notification frame issuing method. That is, in this method, while a time required until a transmission right is captured is not predicted by employing a utilization ratio (Busy ratio) of a channel, a time required until the transmission right is captured is calculated from such a time required until the transmission right was captured in the past.

Figure 6:
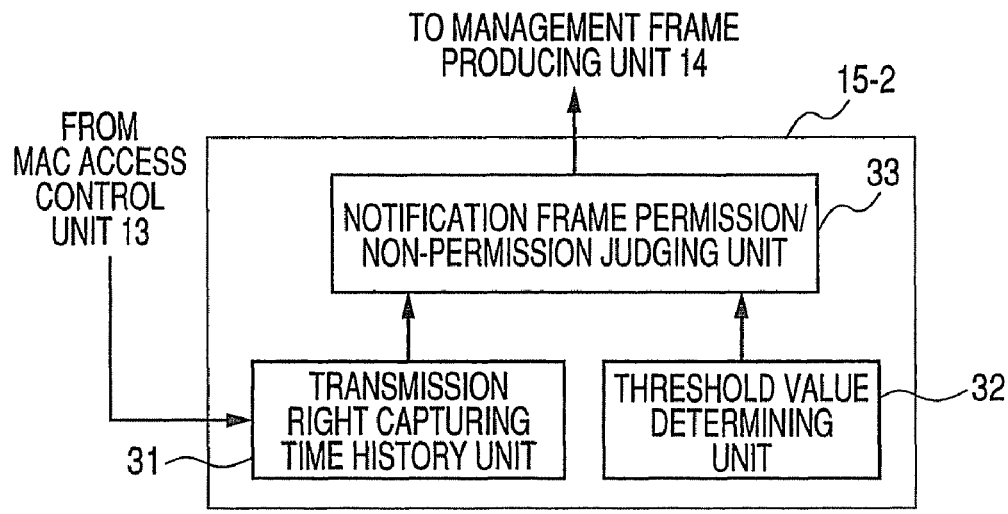
FIG. 6 is a functional block diagram for indicating a second embodiment as to the recommended bandwidth judging unit 15 of the wireless communication apparatus shown in FIG. 3.

FIG. 6 shows a functional block of a recommended bandwidth judging unit 15-2 for calculating a time required until a transmission right is captured without employing a utilization ratio (Busy ratio) of a channel.

A transmission right capturing time history unit 31 counts times until the previous transmission rights were captured in a discrimination manner when a 20 MHz-transmission is carried out, and when a 40 MHz-transmission is carried out.

The transmission right capturing time history unit 31 counts the below-mentioned times in the discrimination manner in such a case that the 20 MHz-transmission is performed, and also, the 40 MHz-transmission is performed, and then, stores thereinto the counted times, while the above-described times are defined as follows: That is, when the MAC access control unit 13 tries to capture transmission rights based upon the DCF, or the EDCA of the CSMA/CA base by the carrier sense corresponding to the MAC access control of the IEEE 802.11 standard rule, the above-described time is defined by that after generated data have been stacked in an MAC transmission queue, the transmission right is captured by employing either the DCF or the EDCA, and then, a transmission is commenced. In other words, as to the data obtained when the 40 MHz-transmission is performed, the transmission right capturing time history unit 31 counts the time until the transmission right is captured in the 40 MHz-transmission, and then, stores thereinto the counted time, whereas as to the data obtained when the 20 MHz-transmission is performed, the transmission right capturing time history unit 31 counts the time until the transmission right is captured in the 20 MHz-transmission, and then, stores thereinto the counted time.

Then, when a judgement of a recommended bandwidth is required in a notification frame permission/non-permission judging unit 33, the transmission right capturing time history unit 31 averages the respective previously-stored times required until the transmission rights were captured in the case of the 20 MHz-transmission and in the case of the 40 MHz-transmission. Instead of the above-explained averaging process operation, alternatively, times until the transmission rights are captured may be continuously averaged when a BSS is commenced, or when the BSS is entered; these times may be averaged/updated every time a certain constant time period (for example, Beacon interval time period) has elapsed; these times may be averaged/updated every time a predetermined frame transmission number is established, or a predetermined frame reception number is established; and the like, namely, these times until the transmission rights are captured may be averaged every time any frequency/interval are established.

Both the time required until the transmission right is captured in the 20 MHz-transmission, and the time required until the transmission right is captured in the 40 MHz-transmission, which have been obtained by being averaged in the above-described manner, are inputted to the notification frame permission/non-permission judging unit 33.

A threshold value determining unit 32 determines threshold values by employing the time required until the transmission right is captured in the 20 MHz-transmission, and the time required until the transmission right is captured in the 40 MHz-transmission, which have been obtained by being averaged by the transmission right capturing time history unit 31. These threshold values are used in order that the notification frame permission/non-permission judging unit 33 judges and controls the transmission of the recommended bandwidth notification frame. It should also be noted that this threshold value determining unit 32 may be arranged in a similar manner to the above-described first embodiment.

The notification frame permission/non-permission judging unit 33 judges either "bandwidth of 20 MHz is recommended" or "bandwidth of 40 MHz is recommended" based upon the averaged times until the transmission rights are captured in such a case that data frames are transmitted through the respective channels, which are derived from the transmission right capturing time history unit 31, and also, based upon the respective threshold values derived from the threshold value determining unit 32. The judging method of this notification frame permission/non-permission judging unit 33 may be realized in a similar manner to that of the first embodiment.

In other words, in the case that the notification frame permission/non-permission judging unit 33 judges that a time required in the 40 MHz-transmission is longer than a time required in the 20 MHz-transmission and a throughput deterioration may conversely occur due to the 40 MHz-transmission, the notification frame permission/non-permission judging unit 33 judges that the recommended bandwidth corresponds to "bandwidth of 20 MHz is recommended." Also, in the case that the notification frame permission/non-permission judging unit 33 judges that a time required in the 40 MHz-transmission is not so longer than a time required in the 20 MHz-transmission by which the throughput deterioration may occur due to the 40 MHz-transmission, the notification frame permission/non-permission judging unit 33 judges that the recommended bandwidth corresponds to "bandwidth of 40 MHz is recommended." When these judged recommended bandwidths are different from the preceding recommended bandwidths, the notification frame permission/non-permission judging unit 33 notifies this fact to the management frame producing unit 14. Thus, a recommended bandwidth notification frame is produced by the management frame producing unit 14. Under control of the MAC access control unit 19, a transmission right is captured based upon DCF (distributed Coordination Function), or EDCA (Enhanced Distributed Channel Access) of the CSMA/CA base by the carrier sense corresponding to the MAC access control of the IEEE 802.11; and thereafter, the recommended bandwidth notification frame formed in the management frame producing unit 14 is transmitted via the physical layer unit 10 so as to notify the commended bandwidth.

Also, when the transmission right capturing time history unit 31 calculates times required until transmission rights are captured, in such a case that the EDCA is employed as the MAC access control, the times until the transmission rights are captured are different from each other, depending upon traffic sorts of data (access categories: AC). In the CSMA/CA system, such a condition that media are continuously under Idle status by carrier sense for a time duration longer than, or equal to a constant time constitutes a condition for capturing a transmission right, because definition time periods (AIFS: Arbitration Inter Frame Space) having a constant time are different from each other due to the AC in the EDCA. As a consequence, it is desirable that when the times required until the transmission rights are captured are calculated in the case that the EDCA is employed, in order that unequal results due to the sort of AC are not produced, times required until transmission rights are captured are counted by employing such times only when data of AC having a specific AIFS is transmitted, and then, the counted times are averaged.

Otherwise, in such a case that times required until transmission rights are captured are averaged which have been obtained when data of ACs having different AIFSs are transmitted, it is desirable to calculate the times until the transmission rights are captured by weighting these times in order that the AIFSs of the respective ACs become equal to each other. Since the above-described calculations are carried out, the unequal results due to the sorts of ACs are not produced even in such a case that, for example, only data of such an AC (access category) whose AIFS (arbitration inter frame space) is very long are transmitted in the 20 MHz-transmission, and also, only data of such an AC whose AIFS is very short are transmitted in the 40 MHz-transmission. As a consequence, the times required until the transmission rights are captured in the 20 MHz-transmission, and the times required until the transmission rights are captured in the 40 MHz-transmission can be equally compared/judged with each other.

As previously described, in the second embodiment, such values calculated in such a manner that the times required until the transmission rights were captured which were obtained in the 20 MHz transmission and the 40 MHz transmission of the past communications are calculated and then are averaged. Since this averaged time is employed, the recommended bandwidth capable of expecting that the deterioration of the throughput can be avoided can be judged without performing the below-mentioned time prediction, and then, the judged recommended bandwidth can be notified. The above-described time prediction is not performed as follows: That is, the channel utilization ratio (Busy ratio) is calculated, and then, the times required until the transmission rights are captured in the 20 MHz transmission and the 40 MHz transmission are predicted from the calculated channel utilization ratio.

Next, a further embodiment as to the recommended bandwidth judging unit 15 for notifying the recommended bandwidth, according to the present embodiment, will be now described as follows; and a description will now be made how to determine a recommended bandwidth.

Third Embodiment

Figure 7:
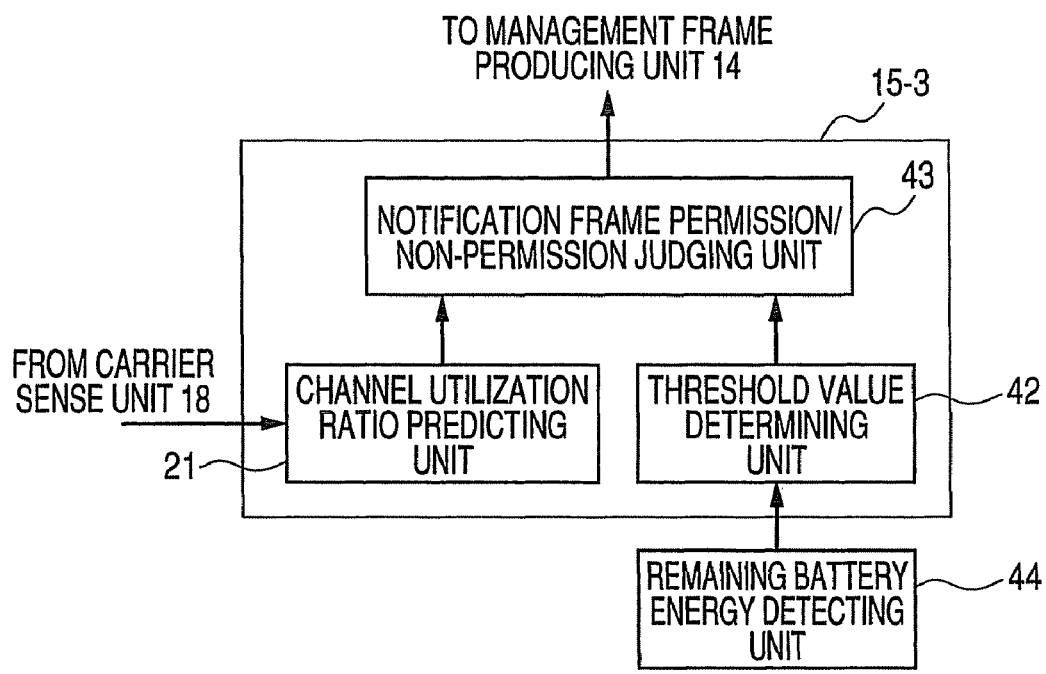
FIG. 7 is a functional block diagram for indicating a third embodiment as to the recommended bandwidth judging unit 15 of the wireless communication apparatus shown in FIG. 3.

A third embodiment is such an example that with respect to issuing of a recommended bandwidth notification frame in a wireless communication apparatus, a judgement is made by furthermore considering a remaining energy amount of a battery of a wireless terminal. FIG. 7 shows a functional block of a recommended bandwidth judging unit 15-3 arranged by that a function for inputting a remaining energy amount of a battery derived from a remaining battery energy amount detecting unit 44 is additionally provided with the recommended bandwidth judging unit 15-1 of the first embodiment.

The remaining battery energy amount detecting unit 44 detects a remaining battery energy amount of the own wireless communication apparatus in a periodic manner, or each time. The detected remaining battery energy amount of the wireless terminal (own wireless communication apparatus) is entered to a threshold value determining unit 42 of the recommended bandwidth judging unit 15-3.

As previously described, in the threshold value determining unit 42, while such values set as fixed values respectively, values in response to conditions each time, or proper values properly selected from prepared values in response to the conditions are defined as provisional threshold values, the threshold value determining unit 42 finally determines threshold values with respect to the provisional threshold values by further considering the remaining battery energy amount of the own wireless communication apparatus.

In other words, the threshold value determining unit 42 arranges the provisional threshold values in such a manner that the notification frame permission/non-permission judging unit 43 similar to that of the first embodiment judges "bandwidth of 20 MHz is recommended" when the remaining battery energy amount becomes smaller, and then, determines the final threshold value. Also, in the case that the notification frame of "bandwidth of 20 MHz is recommended" is notified to the wireless communication apparatus of the communication counter party, thereafter, the threshold value determining unit 42 arranges the provisional threshold values in such a manner that the notification frame permission/non-permission judging unit 43 judges "bandwidth of 40 MHz is recommended" when the remaining battery energy amount becomes larger, due to recharging operation, and then, determines the final threshold value. A concrete description is made of such a embodiment that, for example, the threshold value 7 and the threshold value 8 of the first embodiment are set as the provisional threshold values. It is so assumed that such a value (threshold value 8−α) that a remaining battery energy amount detected by the remaining battery energy amount detecting unit 44 is smaller than, or equal to a certain threshold value "A" is the threshold value which is finally determined by the threshold value determining unit 42. Also, in the case that a remaining battery energy amount is larger than, or equal to a certain threshold value "B", (threshold value 7+β) is assumed as the final threshold value determined by the threshold value determining unit 42 (in this case, α, β>0) It should be noted that the threshold values "A" and "B" may be set as fixed values, or may be alternatively set as such values in response to conditions each time. Furthermore, while plural pieces of the threshold values "A" may be prepared (for instance, A1>A2>A3>A4) in response to a remaining battery energy amount, values "α" which are subtracted therefrom when remaining battery energy amounts are made coincident with the ranges of the respective threshold values may be increased in such a stepwise manner as α1<α2<α3<α4 in response to remaining battery energy amounts. In other words, the smaller the remaining battery energy amount becomes, the larger the value of "α" to be subtracted is increased. Also, based upon a similar technical idea, the value of "β" to be added to the threshold value 7 may be varied in a stepwise manner in response to remaining battery energy amounts. Since the above-described adding/subtracting operations are carried out, the smaller the remaining battery energy amount is decreased, the smaller the threshold value for recommending the 20 MH-transmission can be decreased. In other words, the smaller the remaining battery energy amount becomes, the threshold value determining unit 42 can determine such a threshold value capable of judging "bandwidth of 20 MHz is recommended." Also, the larger the remaining battery energy amount becomes, the threshold value determining unit 42 can determine such a threshold value capable of judging "bandwidth of 40 MHz is recommended."

In the 40 MHz-transmission, electric power consumed in various technical aspects, for instance, filtering bands of an analog filter and a digital filter are expanded twice for data receptions, becomes higher than that of the 20 MHz-transmission.

As a consequence, since the threshold values are determined by considering also the remaining battery energy amount in accordance with the above-described manner, even under such conditions that the times required until the transmission rights are captured are equal to each other, the bandwidths can be properly judged and controlled as follows: That is, the bandwidth judging unit 15-3 judges/controls that such a trend is increased in which the smaller, the remaining battery energy amount is decreased, the recommended bandwidth notification frame is notified as "bandwidth of 20 MHz is recommended." Also, in the case that the notification frame of "bandwidth of 20 MHz is recommended" is notified to the wireless communication apparatus of the communication counter party, thereafter, the bandwidth judging unit 15-3 judges/controls that such a trend is increased in which the larger, the remaining battery energy amount becomes due to the recharging operation, the recommended bandwidth notification frame is notified as "bandwidth of 40 MHz is recommended." As a result, in such a case that the bandwidth determining unit 15-3 judges that the remaining battery energy amount of the own wireless communication apparatus becomes small, the recommended bandwidth notification frame of "bandwidth of 20 MHz is recommended" is notified to the communication counter terminal, so that the 40 MHz transmission cannot be carried out from the wireless communication apparatus of the communication counter party. Also, the own wireless communication apparatus can be brought into only the reception of 20 MHz-bandwidth under which the reception electric power is low. Accordingly, the waiting time (communication available time) can be increased. As a consequence, in accordance with this third embodiment, not only such a basic judging process operation can be carried out in view of the throughput aspect judged by the times required until the transmission rights are captured in the 40 MHz-transmission and the 20 MHz-transmission, but also the synthetic judging process operation can be carried out in order that the recommended bandwidth notification of "bandwidth of 20 MHz is recommended" is issued in combination with the judgement based upon the power consumption aspect.

On the other hand, when the recommended bandwidth judging unit 15-3 can judge such a condition that after the recommended bandwidth notification frame of "bandwidth of 20 MHz is recommended" has been notified to the wireless communication apparatus of the communication counter party, there is a sufficiently large amount of the remaining battery energy, the recommended bandwidth judging unit 15-3 can perform a synthetic judging process operation in order to issue the recommended bandwidth notification frame of "bandwidth of 40 MHz is recommended" by considering not only the throughput technical aspect, but also the power consumption aspect.

In accordance with the wireless communication apparatus of the present embodiment which has been described in detail and functions as the transmission source, the first wireless communication and the second wireless communication, whose bandwidths are different from each other, can be selected as the wireless communication to be recommended based upon the transmission right capturing times, and thus, the selected recommended wireless communication can be notified to the wireless communication apparatus of the communication counter party. As a result, the improvement in the throughput can be expected.

According to the above-described embodiments, the wireless communication capable of employing such a recommended transmission channel width can be realized by which it is predictable that the throughput is furthermore improved.

It should also be understood that the present invention is not limited merely to the above-described embodiments, but may be embodied by modifying the structural elements at embodying stages without departing from the technical scope of the present invention. Also, various sorts of invention may be realized by properly combining a plurality of structural elements disclosed in the above-described embodiments. For instance, several structural elements may be alternatively deleted from all of the structural elements represented in the embodiments. In addition, the structural elements described in the different embodiments may be properly combined with each other.

What is claimed is:

1. A wireless communication apparatus for performing a first wireless communication with a first channel having a first bandwidth, and a second wireless communication with a second channel having a second bandwidth wider than the first bandwidth and having a frequency band covering the first channel, in accordance with CSMA/CA system by a carrier sense, comprising:
   a medium access control (MAC) unit;
   a predicting unit configured to predict a first time required until a transmission right for the first wireless communication is captured, and a second time required until a transmission right for the second wireless communication is captured, respectively;
   a judging unit configured to judge that either one of the first wireless communication and the second wireless communication is recommended based upon (1) a throughput of the first wireless communication and a throughput of the second wireless communication and (2) the first time and the second time which are predicted by the predicting unit, wherein the judging unit judges to recommend the first bandwidth is employed in either one among a first case, a second case and a third case, wherein the first case is that the predicted first time is smaller than a first threshold value, and the predicted second time is larger than a second threshold value, wherein the second case that a ratio of the predicted second time with respect to the predicted first time is larger than a third threshold value, and wherein the third case that time obtained by subtracting the predicted first time from the predicted second time is larger than a fourth threshold value; and
   a producing unit producing, when the judging unit judges that a wireless communication different from a present wireless communication is recommended, a notification frame including information indicative of the recommended wireless communication, wherein the produced notification frame is transmitted.

2. A wireless communication apparatus according to claim 1, wherein the recommended wireless communication is selected from the first wireless communication and the second wireless communication, and
   wherein a data frame to be transmitted is received by a selected wireless communication selected from the first wireless communication and the second wireless communication.

3. A wireless communication apparatus according to claim 1, wherein the predicting unit predicts the first time by a channel utilization ratio in the first channel, and
   wherein the predicting unit predicts the second time by a channel utilization ratio in the second channel.

4. A wireless communication apparatus according to claim 3, wherein:
   the channel utilization ratio predicted by the predicting unit is calculated based upon a ratio of a time period indicative of "busy" within a predetermined time period when a channel is carrier-sensed within the predetermined time period.

5. A wireless communication apparatus according to claim 1, wherein the predicting unit counts time required until a transmission right is captured each time with respect to a transmission performed by the first channel for the first wireless communication within a certain time period, and averages the counted time so as to predict the first time; and
   wherein the predicting unit counts time required until a transmission right are captured each time with respect to a transmission performed by the second channel for the second wireless communication within a certain time period, and averages the counted time so as to predict the second time.

6. A wireless communication apparatus according to claim 1, comprising:
   a battery; and
   a detecting unit configured to detect a remaining energy amount of the battery
   wherein the judging unit judges that either one of the first wireless communication and the second wireless communication is recommended based upon the first time and the second time which are predicted by the predicting unit, and the detected remaining battery energy amount.

7. A wireless communication apparatus according to claim 3, comprising:
   a battery; and
   a detecting unit configured to detect a remaining energy amount of the battery
   wherein the judging unit judges that either one of the first wireless communication and the second wireless communication is recommended based upon the first time and the second time which are predicted by the predicting unit, and the detected remaining battery energy amount.

8. A wireless communication apparatus as claimed in claim 1, wherein, after a notification frame for recommending that the first bandwidth is employed is transmitted with respect to an external communication terminal, the judging unit judges to recommend that the second bandwidth is employed in either one case among first to third cases,
   wherein the first case is that the predicted first time is larger than a fifth threshold value, and the predicted second time is smaller than a sixth threshold value,
   wherein the second case is that a ratio of the predicted second time with respect to the predicted first time is smaller than a seventh threshold value,
   wherein the third case is that time obtained by subtracting the predicted first time from the predicted second time is smaller than an eighth threshold value, and
   wherein the notification frame is produced by including information indicative of a wireless communication for recommending that the second bandwidth is employed.

9. A wireless communication apparatus as claimed in claim 1, wherein the judging unit judges to recommend that the second bandwidth is employed in either one case among first to third cases,
   wherein the first case is that the predicted first time is larger than a fifth threshold value, and the predicted second time is smaller than a sixth threshold value,
   wherein the second case is that a ratio of the predicted second time with respect to the predicted first time is smaller than a seventh threshold value,
   wherein the third case is that time obtained by subtracting the predicted first time from the predicted second time is smaller than an eighth threshold value, and
   wherein the notification frame is produced by including information indicative of a wireless communication for recommending that the second bandwidth is employed.

10. A wireless communication apparatus as claimed in claim 3, wherein the judging unit judges to recommend that the second bandwidth is employed in either one case among first to third cases,
    wherein the first case is that the predicted first time is larger than a fifth threshold value, and the predicted second time is smaller than a sixth threshold value,
    wherein the second case is that a ratio of the predicted second time with respect to the predicted first time is smaller than a seventh threshold value,
    wherein the third case is that time obtained by subtracting the predicted first time from the predicted second time is smaller than an eighth threshold value, and
    wherein the notification frame is produced by including information indicative of a wireless communication for recommending that the second bandwidth is employed.

11. A wireless communication apparatus according to claim 8, comprising:
    a battery; and
    a detecting unit configured to detect a remaining energy amount of the battery; and
    wherein, if the remaining battery energy amount detected by the detecting unit is smaller than a first predetermined value, the judging unit sets that the first threshold value is large and the second threshold value is small, or the third threshold value is small, otherwise the fourth threshold value is small, and
    wherein, if the remaining battery energy amount detected by the detecting unit is larger than a second predetermined value, the judging unit sets that the fifth threshold value is small and the sixth threshold value is large, or the seventh threshold value is large, otherwise the eighth threshold value is large.

12. A wireless communication apparatus according to claim 1, comprising:
    a battery; and
    a detecting unit configured to detect a remaining energy amount of the battery; and
    wherein, if the remaining battery energy amount detected by the detecting unit is smaller than a first predetermined value, the judging unit sets that the first threshold value is large and the second threshold value is small, or the third threshold value is small, otherwise the fourth threshold value is small, and
    wherein, if the remaining battery energy amount detected by the detecting unit is larger than a second predetermined value, the judging unit sets that the fifth threshold value is small and the sixth threshold value is large, or the seventh threshold value is large, otherwise the eighth threshold value is large.

* * * * *